June 5, 1934.　　　　　J. MANN　　　　　1,962,024
METHOD OF CUTTING PINKS ALONG THE EDGES OF THE FABRICS
Filed April 10, 1933　　　4 Sheets-Sheet 1

Inventor
Joseph Mann
By S. George Tate
Attorney

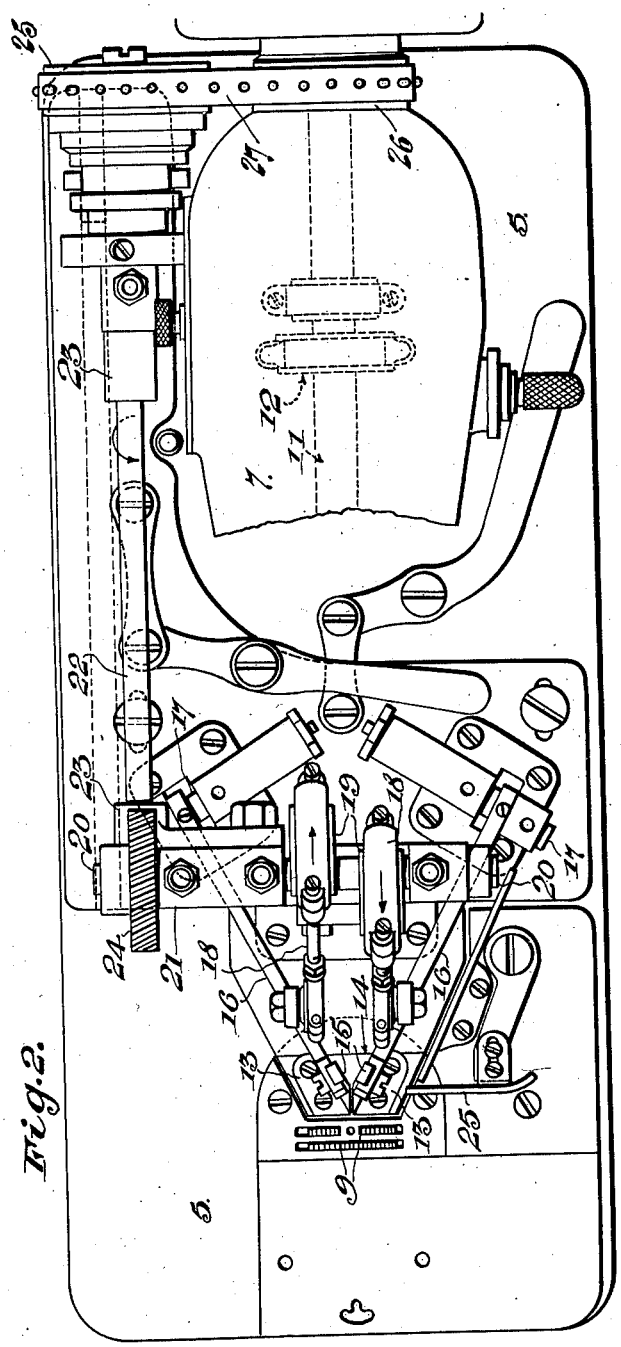

June 5, 1934.  J. MANN  1,962,024
METHOD OF CUTTING PINKS ALONG THE EDGES OF THE FABRICS
Filed April 10, 1933  4 Sheets-Sheet 3
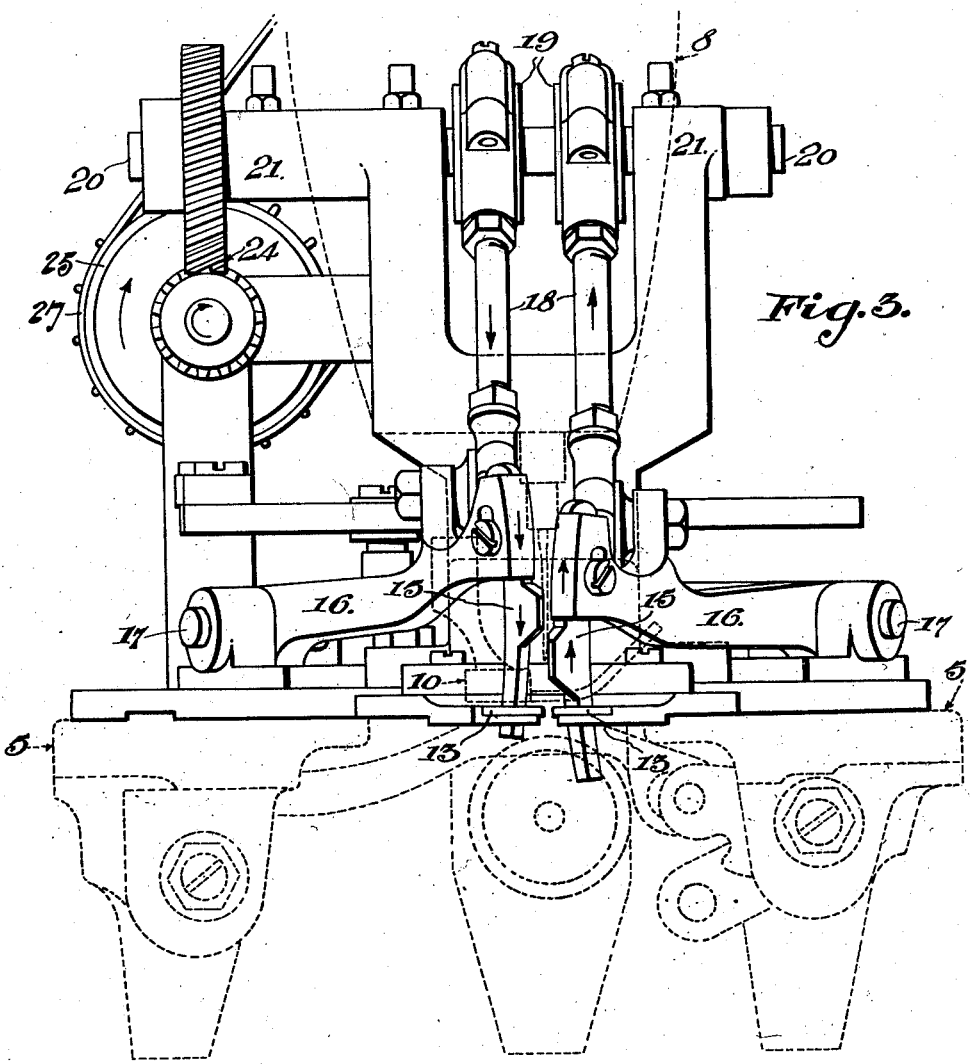
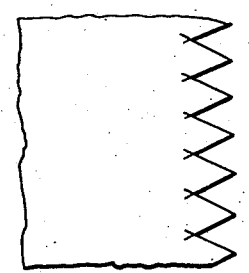
Inventor
Joseph Mann June 5, 1934.　　　　　J. MANN　　　　　1,962,024
METHOD OF CUTTING PINKS ALONG THE EDGES OF THE FABRICS
Filed April 10, 1933　　　4 Sheets-Sheet 4
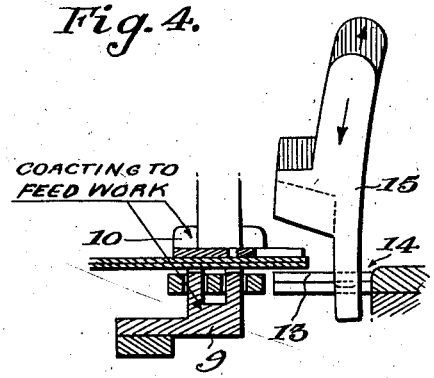
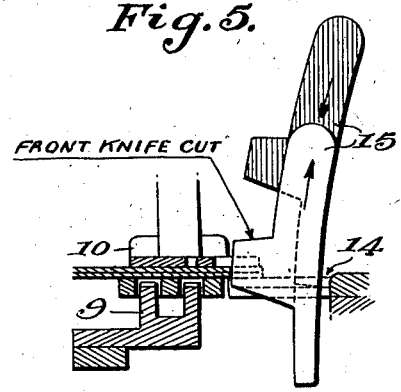
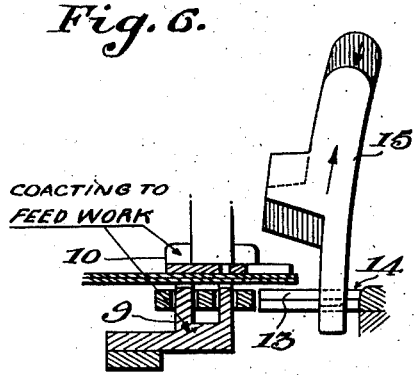
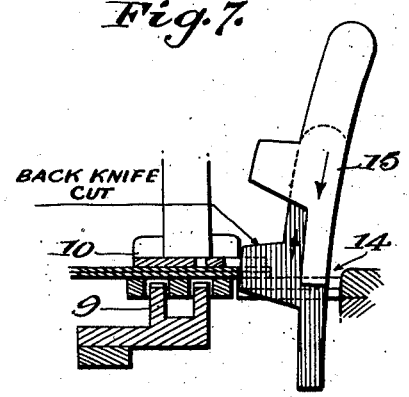
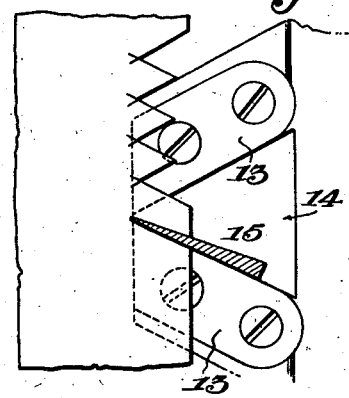
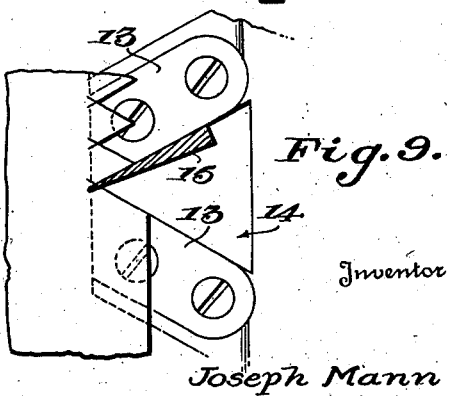
Inventor
Joseph Mann
By S. George Tate
Attorney Patented June 5, 1934

1,962,024

UNITED STATES PATENT OFFICE 1,962,024

METHOD OF CUTTING PINKS ALONG THE EDGES OF THE FABRICS

Joseph Mann, Philadelphia, Pa., assignor, by mesne assignments, to Lewis Invisible Stitch Machine Co., St. Louis, Mo.

Application April 10, 1933, Serial No. 665,437

9 Claims. (Cl. 164—17.5)

The invention relates to the art of pinking or edgenotching fabrics or similar material and resides in the provision of a new and improved method of accomplishing said pinking or edge notching in a manner assuring clean cutting in the angles defining the depth of the pinks or notches.

It has been the custom, in pinking or notching edge portions of fabrics and the like, to traverse the edge portions at regularly spaced intervals with rotary or reciprocatory cutting elements having V-shaped cutting portions designed to cut a complete pink or notch at each traverse. I find this method of cutting to be inefficient because of the need for employing cutters of the type having V-shaped portions and the difficulties experienced in attempting to maintain such cutting edges duly sharp in order to enable them to cut cleanly in the angles defining the depth of the pinks or notches.

It is, therefore, an object of the invention to provide a new and improved fabric pinking or notching method which consists in supporting the fabric, and forming in the edge portion thereof cuts bearing angular relation in order to cooperate in forming the desired pinks or notches, and intersecting in the angles defining the pinks to assure clean cutting even though the cutting means should become somewhat dulled.

Another object of the invention is to provide a new and improved method of pinking or notching fabrics or the like which consists in supporting the fabric, forming therein cuts bearing angular relation, and feeding the fabric to cause the cuts to cooperate in forming the pinks or notches and to intersect at the angles defining the depth of said pinks or notches.

With these and other objects in view which will more fully appear, the nature of the invention will be more clearly understood by following the description, the appended claims, and the several views illustrated in the accompanying drawings.

In the drawings:—

Figure 2 is a plan view of the parts shown in Figure 1, a portion of the overhanging arm being broken away.

Figure 3 is a left end view of the cutting devices shown in Figure 1, parts of the machine framing being shown in dotted line phantom.

Figures 4, 5, 6 and 7 are somewhat diagrammatic detail sectional views respectively illustrating a work feed step, a front knife cut step, a second work feed step, and a back knife cut step, all events in the cycle of operations contributing toward the formation of a single pink or notch.

Figure 8 is a plan view illustrating the front knife cut step shown in Figure 5.

Figure 9 is a plan view illustrating the back knife cut step shown in Figure 7.

Figure 10 is a plan view of a complete pinked or notched fabric portion.

Figure 11 is a diagrammatic view illustrating the timed relation of the work feeding and cutting steps.

Figure 1:
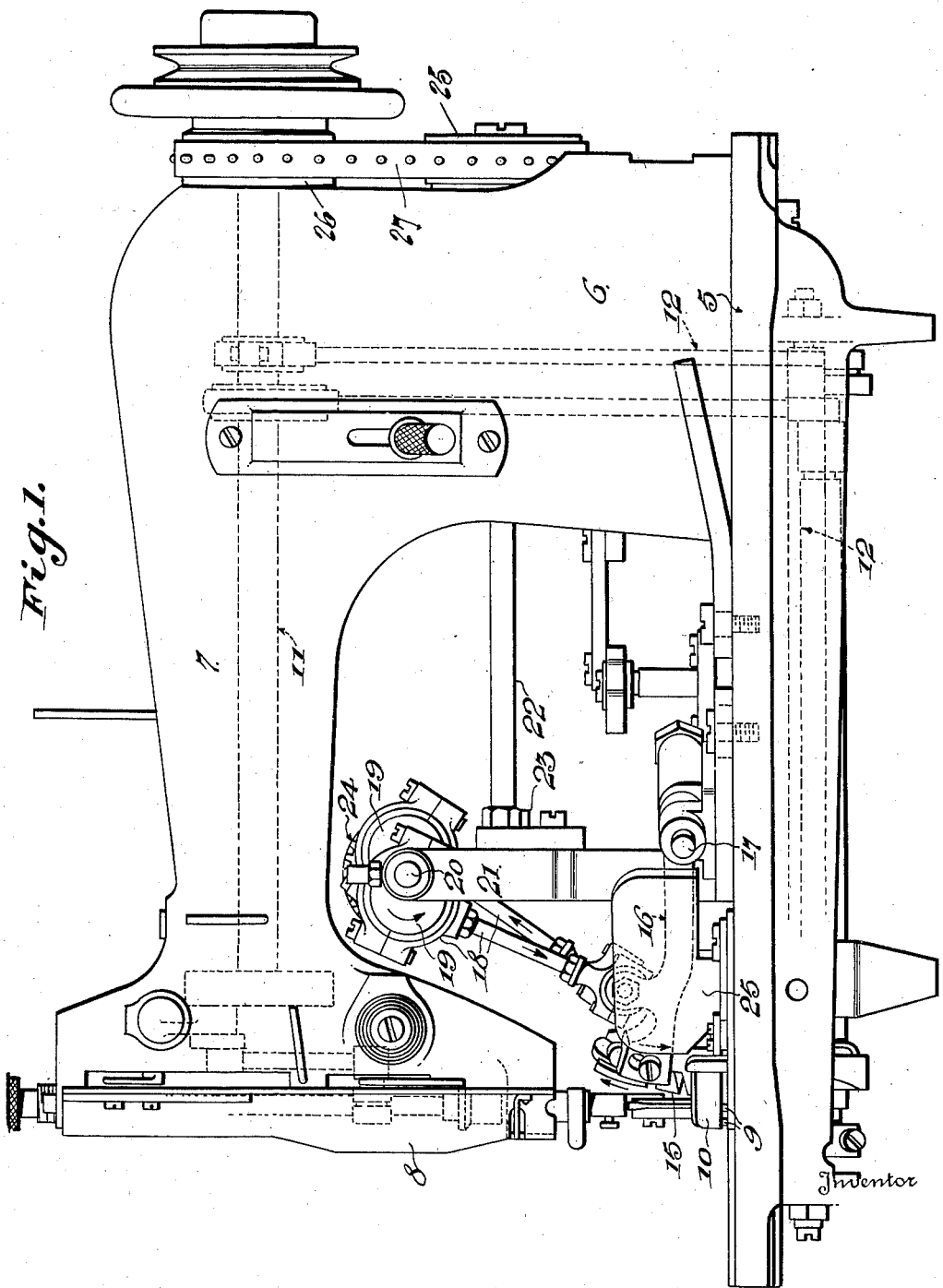
Figure 1 is a front elevation illustrating one means for practicing the invention embodied in a sewing machine.

Like numerals of reference indicate like parts in all of the figures of the drawings and in these drawings I have illustrated one simple means by which the steps of my improved pink cutting method may be practiced, it being understood of course that the steps of the method comprising my invention may be performed by hand or by any other mechanism found practical.

In the particular disclosure mentioned, I have shown mechanism adaptable to use on a conventional sewing machine, this particular mechanism being claimed in my co-pending application filed April 10, 1933, Serial No. 665,435. The claims of this application are of course limited to my improved pink cutting method.

The mechanism disclosed includes a work support base 5, a standard 6, an overhanging arm 7, a sewing head 8, and a 4-motion intermittent feed dog 9 with which a presser foot 10 cooperates to feed the fabric or other work step-by-step over the base 5. A main power or needle shaft 11 is rotatably mounted in the arm 7 and provides a power take-off from which the work feeding means and the work cutting means are driven in suitably timed relation. The connections employed for imparting the 4-motion intermittent feed movement to the dog 9 are generally designated 12.

All of the parts above described are conventional sewing machine parts and it is considered unnecessary to dwell longer on the details of construction and operation thereof, they being well understood by workers in the art.

I will now proceed to describe briefly the means disclosed for effecting the pink forming cuts. Angularly disposed ledger blades 13 are provided at one side of the feeding means 9, 10, and between these ledger blades is provided a triangular cut-out 14 to permit passage of the cutting knives or blades. An individual cutter blade 15 cooperates, in shearing relation, with each of the ledger blades to form in the edge of the work or fabric being fed individual cuts bearing angular relation and cooperating to form the desired pinks.

Each cutter blade 15 is carried by an oscillatable arm 16 pivotally supported at 17 on the base 5, and each arm 16 is pitman-and-strap-connected as at 18 to an eccentric 19 secured upon a jack shaft 20 rotatably supported as at 21. The eccentrics 19 are spaced 180° apart in the direction of rotation of the shaft 20 and thus when the shaft is rotated the blades 15 will be reciprocated alternately into and out of shearing relation with the ledger blades 13.

The feed dog 9 is moved one feed step for each rotation of the power shaft 11, and the jack shaft 20 is rotated once for each two rotations of the power shaft 11 to thus provide for an individual cutter blade and ledger blade or shearing cooperation intermediate each pair of feed steps, or in other words, during each rest interval between feed steps.

This jack shaft drive is accomplished through the medium of a driver shaft 22 rotatably mounted as at 23 and having driving connection with the jack shaft 20 through a 1-to-2 ratio gear couple indicated at 24. The driver shaft is in turn driven from the power shaft 11 through the medium of like size pulleys 25 and 26 respectively mounted on the driver and power shafts, and a belt 27 which passes over said pulleys.

When my improved method is practiced by use of the mechanism described briefly above, the fabric or work is fed over the base 5 in the direction of the arrow A in Figure 2 and, guided by the guide member 25, the edge thereof comes into the zone of operation of the feeding means 9, 10 and the pink cutting blades 15. I will refer to the blade first encountered by the fabric, or the blade lowermost in Figure 2, as the "front blade or knife", the other blade or knife being termed "the back blade or knife".

After a work feed step effected by the feeding means 9, 10 (see Figure 4), and during a rest interval between the particular feed step and the next succeeding feed step, the front knife or blade cuts through or traverses the edge of the fabric forming an individual cut therein bearing angular relation to said edge. See Figures 5 and 8. After this individual or front cut is completed another feed step is imparted to the fabric (see Figure 6) and during the next rest interval of the feeding means, the back knife or blade cuts through or traverses the edge of the fabric forming an individual cut therein bearing angular relation to the fabric edge and to the front cut so as to cooperate with the front cut in forming a complete pink or notch in the edge of the fabric, said individual cuts intersecting slightly in the depth of the angles to assure clean cutting. See Figures 7, 9 and 11.

The sequence of operations above described may be termed a four event cycle, four operative events taking place during the completion of a single pink or notch, namely, (1) a feed step, (2) a front knife or blade cut, (3) a second feed step, and (4) a back knife or blade cut. This cycle is repeated to produce the number of pinks or notches desired, said pinks or notches being formed in a continuous line and in equidistantly spaced relation.

In Figure 11 of the drawings, I have attempted to illustrate diagrammatically the timed relation of the above mentioned cycle events. In this figure, the line FS represents two revolutions of the power shaft 11 effecting two feed movements of the feeding means as indicated by the upwardly directed humped portions of said line. The line JS represents a single revolution of the jack shaft 20 which takes place during the two revolutions of the power shaft 11 and causes two individual knife or blade cut movements, one a front knife or blade cut, the other a back knife or blade cut, and each occurring during a rest interval of the feeding means or intermediately of two feed steps as indicated in the diagram.

As has been intimated hereinbefore the mechanism disclosed herein is but an example of one means capable of practicing of my improved method, and it is to be understood that the constructions and operations described above may be varied considerably within the scope of the appended claims.

The invention may be said to be characterized by the fact that the pinks are formed by individually made cuts intersecting slightly and bearing angular relation so that although they are individually made, distinguishing from cuts made by cutters having V-shaped portions, each pair of individual cuts cooperate to form a complete pink or notch. The method thus enables the use of simple flat-type cutters easily sharpened. See Figures 8, 9 and 10.

Another feature of the invention is the feeding of the fabric in a manner to cause the individually formed cooperating cuts to intersect as above mentioned. See Figures 4 through 10. This may be accomplished by controlling the length of the work feed steps. Means for providing this adjustable feed are well known to workers in the art and need not be described in detail in this disclosure. Any approved form of such means may be utilized and one simple form of such means is disclosed in detail in the patent issued to E. B. Allen, April 18, 1899, and identified by Number 623,271.

In the foregoing description, I have disclosed a simple and efficient method of cutting pinks or notches which enables the use of relatively inexpensive and easily sharpened flat type cutters and assures clean cutting in the angles defining the depth of the pinks or notches even though the cutting edges become somewhat dulled.

I claim:—

1. The herein described method of pinking fabric or the like which consists in supporting the fabric, forming cuts in the fabric bearing angular relation, and feeding the fabric to cause the cuts to cooperate in forming pinks and to intersect at the angles defining the depth of the pinks.

2. The herein described method of pinking fabric or the like which consists in supporting the fabric, forming cuts in the fabric bearing angular relation, and feeding the fabric step-by-step to cause the cuts to cooperate in forming pinks and to intersect at the angles defining the depth of the pinks.

3. The herein described method of pinking fabric or the like which consists in supporting the fabric, forming successive cuts in the fabric bearing angular relation, and feeding the fabric to cause the cuts to cooperate in forming pinks and to intersect at the angles defining the depth of the pinks.

4. The herein described method of pinking fabric or the like which consists in supporting the fabric, forming successive cuts in the fabric bearing angular relation, and feeding the fabric step-by-step to cause the cuts to cooperate in forming pinks and to intersect at the angles defining the depth of the pinks.

5. The herein described method of pinking fabric or the like which consists in feeding the fabric a feed step of predetermined length, forming in the edge of the fabric a cut bearing angular relation to said edge, feeding the fabric a second feed step of predetermined length, forming a second cut in the edge of the fabric bearing angular relation to said edge and to the previously made cut to cooperate with the previously made cut in forming a pink, and continuing these operative steps and timing said fabric feed to form a line of pinks equidistantly spaced.

6. The herein described method of pinking fabric or the like which consists in feeding the fabric a feed step of predetermined length, forming in the edge of the fabric a cut bearing angular relation to said edge, feeding the fabric a second feed step of predetermined length, forming a second cut in the edge of the fabric bearing angular relation to said edge and to the previously made cut to cooperate with the previously made cut in forming a pink, and continuing these operative steps and timing said fabric feed to form a line of pinks equidistantly spaced and with the initial and second cuts of each pair of cuts forming an individual pink intersecting at the angle defining the depth of the pink.

7. The herein described method of pinking fabric or the like which consists in supporting the fabric, and forming individual pinks by successive cuts in an edge thereof, each pink being completely formed by making successive cuts in said fabric edge bearing angular relation and intersecting in the angle defining the depth of the pink.

8. The herein described method of pinking fabric or the like which consists in supporting the fabric, and forming individual cuts in and through the edge of the fabric bearing angular relation to cooperate in forming the pinks, each said cut intersecting each of the cuts which cooperate therewith in forming a pink whereby said cuts will intersect in the angles defining the depth of the pinks and also at the apices of said pinks.

9. The herein described method of pinking fabric or the like which consists in supporting the fabric, and forming individual successive cuts in and through the edge of the fabric bearing angular relation to cooperate in forming the pinks, each said cut intersecting each of the cuts which cooperate therewith in forming a pink whereby said cuts will intersect in the angles defining the depths of the pinks and also at the apices of said pinks.

JOSEPH MANN.